(12) United States Patent
Ishihara et al.

(10) Patent No.: US 6,836,416 B2
(45) Date of Patent: Dec. 28, 2004

(54) MULTI-OUTPUT POWER CONVERSION CIRCUIT

(75) Inventors: Koshiaki Ishihara, Aichi-ken (JP); Seiki Sakata, Aichi-ken (JP); Yasuharu Odachi, Aichi-ken (JP)

(73) Assignee: Kabushiki Kaishi Toyota Jidoshokki, Kariya (JP)

(*) Notice: Subject to any disclaimer, the term of this patent is extended or adjusted under 35 U.S.C. 154(b) by 205 days.

(21) Appl. No.: 10/091,915

(22) Filed: Mar. 6, 2002

(65) Prior Publication Data
US 2002/0141216 A1 Oct. 3, 2002

(30) Foreign Application Priority Data

Mar. 30, 2001 (JP) ........................................ 2001-099334
Jun. 8, 2001 (JP) ........................................ 2001-174541

(51) Int. Cl.[7] ........................................... H02M 7/5387
(52) U.S. Cl. ..................................................... 363/132
(58) Field of Search .............................. 363/16, 17, 97, 363/98, 131, 132; 318/244, 254, 255, 439, 801, 802, 807, 809, 813, 814, 816, 817

(56) References Cited

U.S. PATENT DOCUMENTS 3,775,663 A * 11/1973 Turnbull ...................... 321/9 A
6,028,405 A * 2/2000 Kume et al. ................. 318/254
6,134,126 A * 10/2000 Ikekame et al. .............. 363/39

FOREIGN PATENT DOCUMENTS

| EP | 0 834 977 A2 | 4/1998 | ............. H02J/7/02 |
| EP | 1 034 968 A1 | 9/2000 | ........... B60L/11/12 |
| JP | 10-337047 | 12/1998 | ........ H02M/7/5387 |

* cited by examiner

Primary Examiner—Matthew V. Nguyen
(74) Attorney, Agent, or Firm—Morgan & Finnegan, LLP (57) ABSTRACT

In a multi-output power conversion circuit which drives a polyphase AC motor and another device but the polyphase AC motor using a DC power source, a transformer is connected to the neutral point of the polyphase AC motor, an AC voltage at a zero-phase voltage frequency is obtained from the transformer, and the other device is loaded with the AC voltage.

8 Claims, 8 Drawing Sheets

MULTI-OUTPUT POWER CONVERSION CIRCUIT

BACKGROUND OF THE INVENTION

1. Field of the Invention

The present invention relates to a multi-output power conversion circuit for driving an AC motor by obtaining two or more pieces of output from one DC power source, and charging an auxiliary power source.

2. Description of the Related Art

Generally, the configuration of a circuit of an electric vehicle can be the configuration for driving motors using one power source to drive a main motor for driving a vehicle, a motor for a heat pump of an airconditioner, etc.

That is, a power source for driving a main motor has been used to provide a current for other devices such as other motors.

Figure 1:
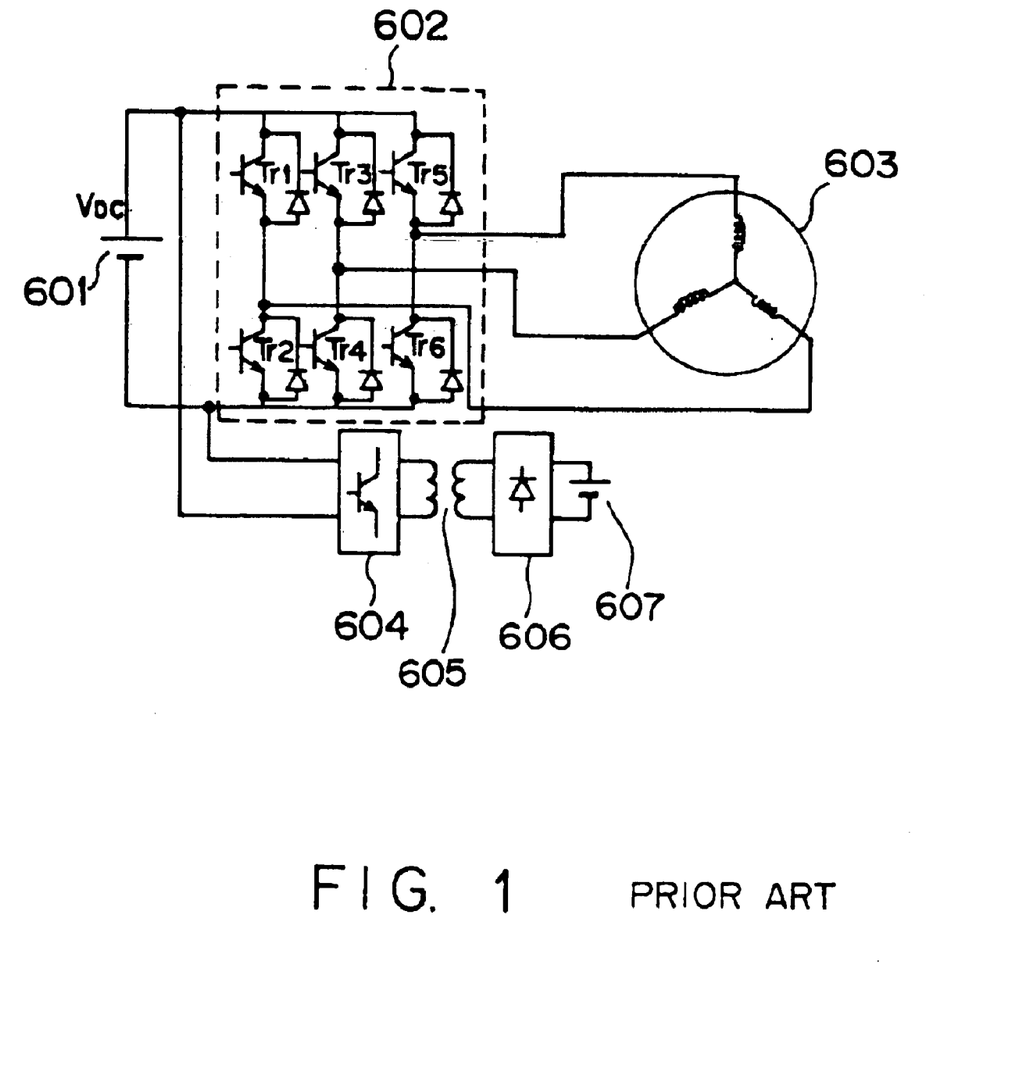
FIG. 1 shows a conventional multi-output power conversion circuit.

FIG. 1 shows a conventional multi-output power conversion circuit for driving using one power source an AC motor and other devices than the AC motor.

In FIG. 1, 601 denotes a DC power source, 602 denotes a main inverter, and 603 denotes, for example, a three-phase main AC motor having three phase differences through the main inverter 602. The main inverter 602 is configured by six switching elements Tr1 through Tr6, and is PWM-controlled. An auxiliary power source 607 is connected to the same line as the DC power source 601 through a switching circuit 604, a transformer 605, and a rectifying circuit 606. Other devices can be an AC motor in addition to the auxiliary power source 607.

As described in FIG. 1, a power source for driving an AC motor has been conventionally used for other devices by using a power source for driving the main AC motor 603 in providing electric power for the auxiliary power source 607, etc.

As shown in FIG. 1, since insulation is required in providing electric power for the auxiliary power source 607, the switching circuit 604 is required in addition to the main inverter 602, thereby causing the problem that the entire circuit becomes very large.

SUMMARY OF THE INVENTION

Thus, the present invention aims at providing a multi-output power conversion circuit capable of having two or more pieces of output using one power supply unit, and realizing a smaller circuit.

To solve the above mentioned problem, the present invention has the following configuration.

That is, according to an aspect of the present invention, the multi-output power conversion circuit of the present invention has output from one DC power source to a polyphase AC motor and other devices than the polyphase AC motor, connects a transformer to the neutral point of the polyphase AC motor, obtains an AC voltage from the transformer using a zero-phase voltage frequency, and outputs the AC voltage to the other devices.

The above mentioned zero-phase voltage frequency refers to a frequency generated at the neutral point of the above mentioned polyphase AC motor, and is different from the frequency driving the polyphase AC motor. In addition, the level of the zero-phase voltage frequency can be lower or higher than the frequency driving the polyphase AC motor.

It is desired that, in the multi-output power conversion circuit according to the present invention, the polyphase AC motor is a first three-phase AC motor, and the other devices are any of an auxiliary power source, a DC motor, and a second three-phase AC motor.

It is also desired that the multi-output power conversion circuit according to the present invention can change a command value when the above mentioned polyphase AC motor is drive-controlled, and can control an AC voltage generated in the transformer.

Furthermore, according to an aspect of the present invention, the multi-output power conversion circuit according to the present invention has output from one DC power source to a polyphase AC motor and other devices than the polyphase AC motor, connects one terminal of a transformer to the neutral point of the polyphase AC motor, connects the other terminal of the transformer to the portion of half the potential of the DC power source, obtains the AC voltage by the zero-phase voltage frequency generated in the transformer, and outputs the AC voltage to the other devices.

It is possible to apply an AC not containing a DC component to the transformer by connecting the other terminal of the transformer to the neutral point of the DC power source.

It is also preferable that the multi-output power conversion circuit according to the present invention connects the transformer to a capacitor in series, and cuts off a DC component.

According to another aspect of the present invention, the multi-output power conversion circuit according to the present invention has output from one DC power source to a polyphase AC motor and other devices than the polyphase AC motor, connects a capacitor to the neutral point of the polyphase AC motor, obtains an AC voltage by the zero-phase voltage frequency from the capacitor, and outputs the AC voltage to the other devices.

Thus, an AC voltage can be obtained by connecting a capacitor instead of a transformer to the neutral point of the multi-output power conversion circuit.

Furthermore, according to a further aspect of the present invention, the multi-output power conversion circuit according to the present invention has output from one DC power source to a polyphase AC motor and other devices than the polyphase AC motor, connects a transformer to the neutral point of the polyphase AC motor, and inserts a capacitor between the neutral point of the polyphase AC motor and the current phase for driving the polyphase AC motor.

In this process, the capacitance of the capacitor is appropriately set, and the current of the carrier frequency component of the polyphase AC motor is led to the transformer through the capacitor. Considering the characteristic of the capacitor, when the frequency gets higher, the impedance becomes lower. Therefore, although the carrier frequency is set high, the current flowing through the transformer does not become low, thereby successfully realizing a smaller transformer.

DESCRIPTION OF THE PREFERRED EMBODIMENTS

The embodiments of the present invention are described below by referring to the attached drawings. According to the embodiments, the explanation centers on the differences from the conventional multi-output power conversion circuit shown in FIG. 1 described above. Therefore, similar units are assigned the same reference numerals, and the detailed descriptions are omitted here for simple explanation.

Figure 2A:
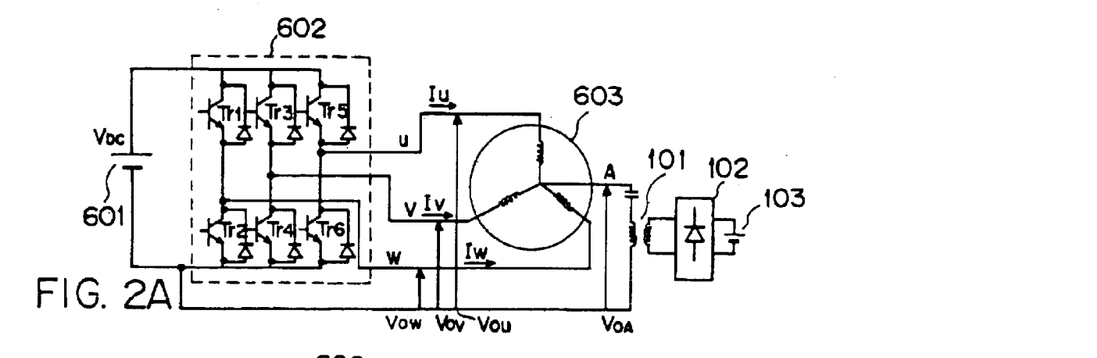
FIGS. 2A, 2B, and 2C show the configuration of the multi-output power conversion circuit according to an embodiment of the present invention.

FIG. 2A shows the configuration of the multi-output power conversion circuit according to an embodiment of the present invention. 601 denotes a DC power source, 602 denotes a main inverter, 603 denotes a main AC motor, 101 denotes a transformer, 102 denotes a rectifying circuit, and 103 denotes a auxiliary power source. The difference from the conventional multi-output power conversion circuit shown in FIG. 1 is that the transformer 101 is connected to the neutral point of the main AC motor 603, and another drive device, that is, the auxiliary power source 103, is connected. The power is supplied to the auxiliary power source 103 from the transformer 101.

Figure 2B:
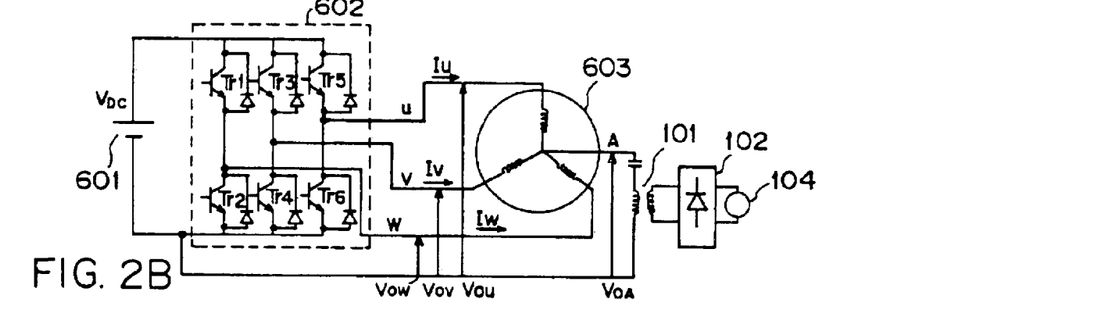

Similarly, FIG. 2B shows the configuration of the multi-output power conversion circuit according to an embodiment of the present invention. The DC power source 601, the main inverter 602, the main AC motor 603, the transformer 101, and the rectifying circuit 102 are similar to those of the configuration shown in FIG. 2A, and are assigned the same reference numerals. The difference from the configuration shown in FIG. 2A is that a DC motor (PCM) 104 is connected through the transformer 101 and the rectifying circuit 102. In FIG. 2B, as in FIG. 2A, the transformer 101 is connected to the neutral point of the main AC motor 603, and the DC voltage is obtained through the rectifying circuit 102. Then, the DC voltage drives the DC motor 104.

Figure 2C:
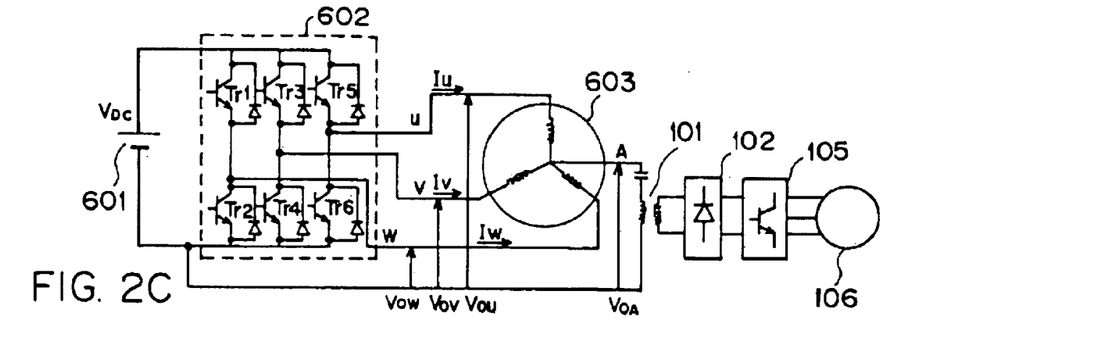

Similarly, FIG. 2C also shows the configuration of the multi-output power conversion circuit according to an embodiment of the present invention. The difference from the configurations shown in FIGS. 2A and 2B is that a subinverter 105 and a sub AC motor 106 are connected through the transformer 101 and the rectifying circuit 102. As shown in FIG. 2C, as in FIGS. 2A and 2B, the transformer 101 is connected to the neutral point of the main AC motor 603, and a DC voltage is obtained through the rectifying circuit 102. The DC voltage is converted into the AC voltage by the subinverter 105, thereby driving the sub AC motor 106. The DC power source 601 can be simply a power source for supplying a DC, or it can be considered that an AC voltage from an AC power source is rectified into a DC voltage. The detailed explanation of the circuit configurations of the rectifying circuit 102, the auxiliary power source 103, the DC motor 104, the subinverter 105, and the sub AC motor 106 is omitted here.

In the multi-output power conversion circuit according to the present invention, the transformer 101 is connected to the neutral point of the main AC motor 603, and an AC voltage is generated from the transformer 101. The electric power can be stored in the auxiliary power source 103 only by converting the AC voltage obtained by the transformer 101 into a DC by the rectifying circuit 102 without a conventional connection to the switching circuit 604, thereby reducing the number of units in the conventional multi-output power conversion circuit.

Described below first is the reason for the AC voltage obtained from the transformer 101 in the multi-output power conversion circuit according to the present invention.

Figure 3A:
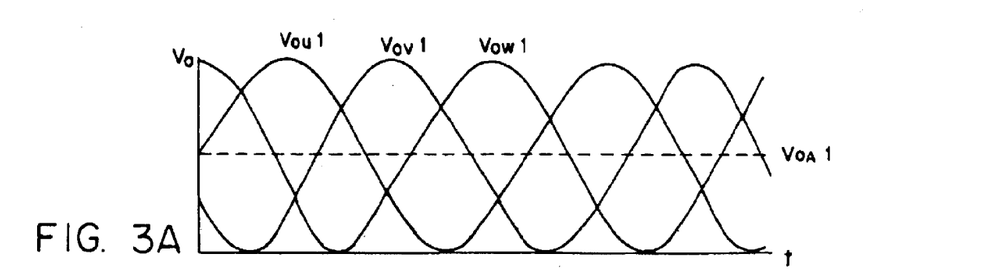
FIG. 3A shows the waveform of the current of each arm of an ideal main inverter.

FIG. 3A shows the waveform of the voltage of each arm (u, v, w) of the ideal main inverter 602.

In FIG. 3A, the vertical axis indicates the magnitude of a voltage, and the horizontal axis indicates a time. Vou1, Vov1, and Vow1 respectively indicates the waveforms of the output voltages of the arm u, arm v, and arm w of the main inverter 602. VOA1 indicates the zero-phase voltage of the main inverter 602. The above mentioned Vou1, Vov1, and Vow1 are expressed by, for example, the following equations.

$$Vou1 = V\sin\omega t + V \quad (1)$$

$$Vov1 = V\sin(\omega t - \tfrac{2}{3}\pi) + V \quad (2)$$

$$Vow1 = V\sin(\omega t + \tfrac{2}{3}\pi) + V \quad (3)$$

where V indicates the amplitude shown in FIG. 3A, and the phase of each arm of the main inverter 602 is different by $\tfrac{2}{3}\pi = 120°$ from each other.

Figure 3B:
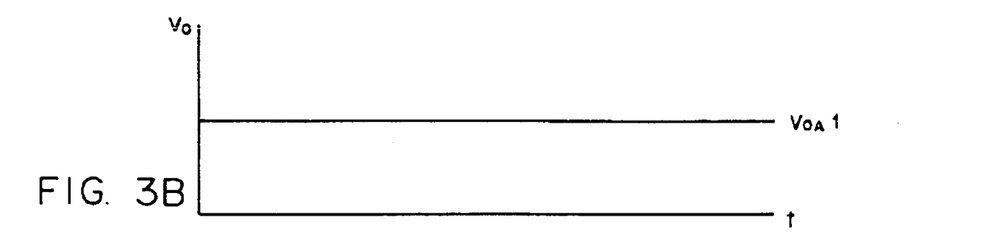
FIG. 3B shows a zero-phase voltage VOA1 at the neutral point of the main inverter.

Normally, the phase of the voltage of each arm of the main inverter 602 shown in FIG. 3A is different by $\tfrac{2}{3}\pi = 120°$ from each other as represented by the equations (1), (2), and (3). Thus, the 120° difference in phase of voltage drives the three-phase main AC motor 603. The zero-phase voltage VOA1 of the neutral point of the main inverter 602 is constant as shown in FIG. 3B.

Figure 3C:
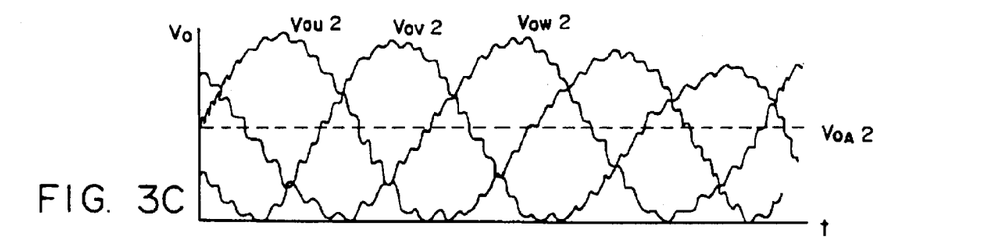
FIG. 3C shows the waveform of the current of each arm of an actual main inverter.

FIG. 3C shows the actual waveform of the current of each arm of the main inverter 602.

In FIG. 3C, as in FIG. 3A, Vou2, Vov2, and Vow2 respectively indicate the waveforms of the output voltages of the arm u, arm v, and arm w of the main inverter 602. VOA2 indicates the zero-phase voltage of the actual main inverter 602.

As shown in FIG. 3C, the waveform of the output voltages of each arm of the actual main inverter 602 is disturbed by the switching operation performed when the main inverter 602 performs a controlling operation. It is the harmonic component (harmonic current) of a current as well known by those skilled in the art. The harmonic current is generally considered to cause a malfunction of other electronic units, and is to be restricted. Therefore, normally, it is desired that the harmonic current is minimized. However, the present invention utilizes the harmonic current to newly obtain another output power.

Figure 3D:
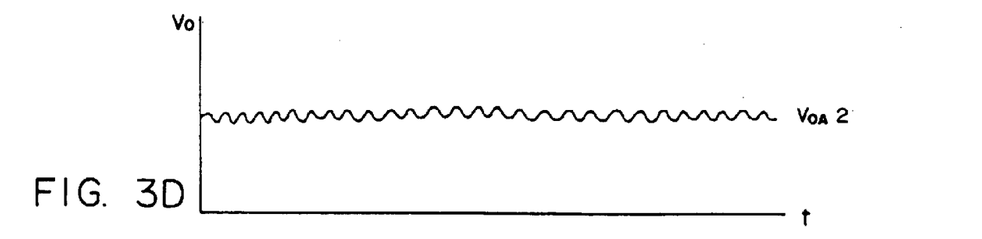
FIG. 3D shows a zero-phase voltage VOA2 at the neutral point of the main inverter.

FIG. 3D shows the zero-phase voltage VOA2 at the neutral point of the main inverter 602. Since the ripple by the switching operation appears at the neutral point, the neutral point of the main inverter 602 has the voltage frequency having a waveform as shown in FIG. 3D. As described above, the disturbance of the waveform by the switching operation of the main inverter 602 is referred to as harmonic, and the value of the harmonic is, for example, 10 through 20 kHz. The AC voltage component generated by inserting the transformer 101 into the neutral point of the main inverter 602 can be obtained.

The control of the operation of the main inverter 602 is performed by the PWM (pulse width modulation) described later. When a triangular wave PWM is controlled, the frequency of 10 kHz is detected at the zero-phase portion as harmonic. When the PWM is instantly controlled, 5–30 kHz is detected. When harmonic by a slot is controlled, the voltage frequency of 0 through 600 Hz is detected at the zero-phase portion. Since these triangular wave PWM, the instant PWM, and the slot harmonic are poor in controllability, it is difficult to freely obtain a desired voltage from a desired zero-phase portion. To improve the operability, it is necessary to provide a chopper after the transformer 101, or provide a control circuit to obtain a constant voltage from the zero-phase portion.

Then, the AC voltage obtained at the neutral point of the main AC motor 603 by the harmonic is retrieved from the transformer 101, and is converted into an AC voltage by the rectifying circuit 102.

That is, the ripple component naturally occurring by driving the main AC motor 603 is used as a second output power source. At the neutral point of the main AC motor 603 for the minus side (ground) of the DC power source, when a command voltage value is changed, the voltage for the changed portion relates to the primary side of the transformer 101. Since the ratio between the primary side and the secondary side of the transformer 101 is 1:n, the transformer 101 can raise or drop the voltage. The AC obtained by the transformer 101 can be rectified by the rectifying circuit 102, and can be connected as an output power source to other circuits which can be charged with the rectified power such as the auxiliary power source 103, the DC motor 104, another sub AC motor 106, etc.

Thus, the control circuit by the PWM generates noise from a high frequency switching waveform. This refers to a harmonic voltage, and an AC voltage component is detected at the neutral point of the main inverter 602.

The control of the harmonic voltage can be performed by changing a command value for adjustment of the controlling operation in the control circuit of the main inverter 602.

Figure 4:
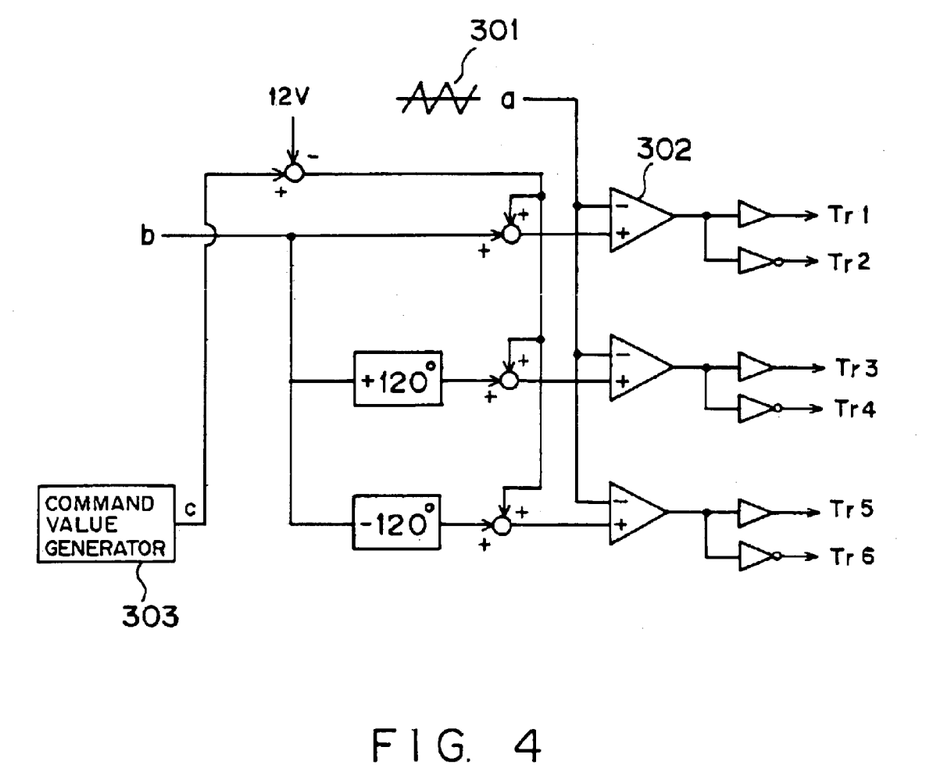
FIG. 4 shows the configuration of the control circuit of the main inverter.

FIG. 4 shows the configuration of the control circuit of the main inverter 602 capable of controlling the zero-phase voltage frequency at the neutral point of the main AC motor 603.

In FIG. 4, a triangular wave generator 301 outputs a triangular wave (carrier wave) signal a for determination of the switching frequency of each of the switching elements Tr1 through Tr6 of the main inverter 602. A comparator 302 compares the signal (sine wave) b for driving the main AC motor 603 with the signal (triangular wave) a output by the triangular wave generator 301, and generates the PWM signal which is a switching signal of each of the switching elements Tr1 through Tr6.

Then, to control the level of the zero-phase voltage frequency of the neutral point, a sine wave signal b is provided for the control signal c output by a command value generator 303. The command value generator 303 monitors the battery voltage value (12 V) of the auxiliary power source 103, the revolution of a motor, the input current value of the onboard auxiliary power source, etc. through the device connected through the transformer 101.

Then, the directions of the current flowing through the primary coil of the transformer 101 connected to the neutral point of the main inverter 602 alternately change. Since a magnetic field is generated in the primary coil of the transformer 101, an AC voltage proportional to the ratio of the winding of the primary coil to the secondary coil is generated in the secondary coil of the transformer 101. Then, the AC voltage generated in the secondary coil of the transformer 101 is rectified by the rectifying circuit 102, accumulated by the auxiliary power source 103, or drives another AC motor 106.

By monitoring and adjusting the command voltage generated by the command value generator 303 as described above, the frequency for driving the main AC motor 603 can be separate from the frequency for the transformer 101.

That is, the voltage frequency of the main AC motor 603 controlled by the control circuit can be represented by, for example, the following equations.

$$Vou = V\sin\omega t + V + V_1 \sin\omega_1 t \quad (4)$$

$$Vov = V\sin(\omega t - \frac{2}{3}) + V + V_1 \sin\omega_1 t \quad (5)$$

$$Vow = V\sin(\omega t + \frac{2}{3}\pi) + V + V_1 \sin\omega_1 t \quad (6)$$

where 'V1 sin ω1 t' indicates the portion newly superposed with a command value changed.

Figure 5A:
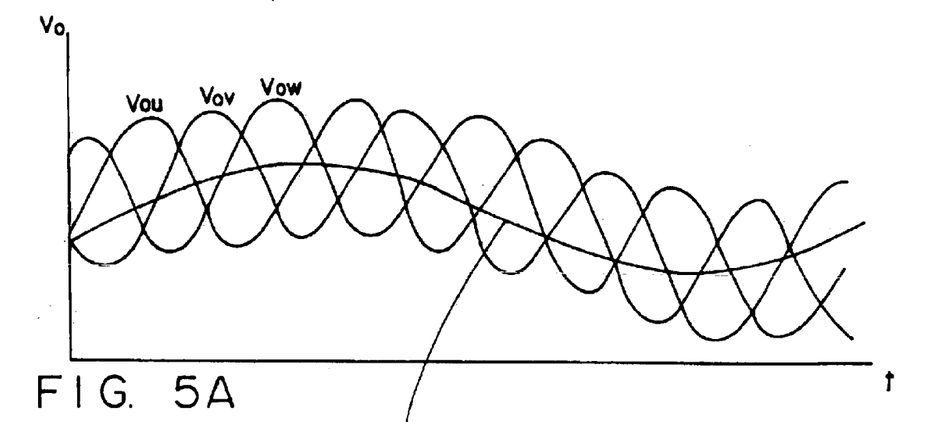
FIG. 5A shows a sine wave when the power source frequency is higher than the zero-phase voltage frequency.

FIG. 5A shows a sine wave when the power source frequency is higher than the zero-phase voltage frequency. That is, shown is a sine wave when the power source angular frequency ω represented by Vo=Vsinωt+V+V1 sin ω1 t is higher than the zero-phase power source angular frequency ω1.

Figure 5B:
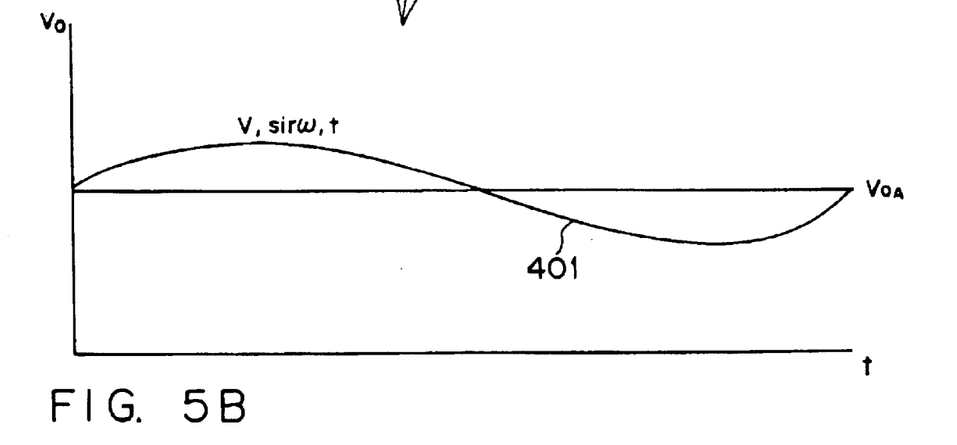
FIG. 5B only shows a zero-phase voltage in the case shown in FIG. 5A.

FIG. 5B only shows a zero-phase voltage 401 shown in FIG. 5A.

As shown in FIG. 5B, + and − alternately appears for the zero-phase voltage 401 with the VOA which is average potential at the neutral point set as a reference. That is, (4), (5), and (6) are superposed as beat. Then, an AC voltage can be obtained by providing the transformer 101 at the neutral point of the main AC motor 603. With ω>ω1, the zero-phase angular frequency ω1 is superposed on the basic power source angular frequency ω for driving the main AC motor 603. Therefore, the zero-phase voltage angular frequency ω1 can be set higher than the power source angular frequency ω. When ω<ω1, the zero-phase voltage is higher (frequency sufficiently high for the transformer 101) than the main inverter 602. Therefore, a smaller transformer 101 can be realized. The transformer 101 can also generate a voltage higher than the input voltage VDC of the DC power source 601.

Figure 6A:
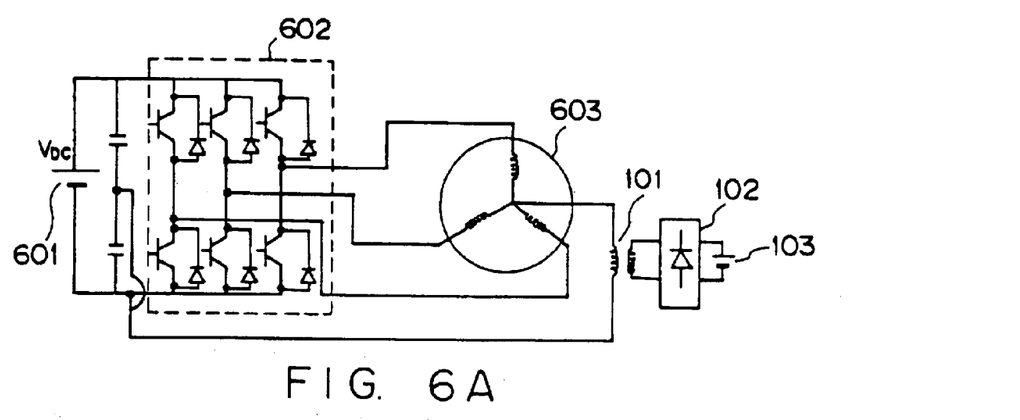
FIG. 6A shows the configuration of the multi-output power conversion circuit according to another embodiment of the present invention.

FIG. 6A shows the configuration of the multi-output power conversion circuit according to another embodiment of the present invention.

Figure 6B:
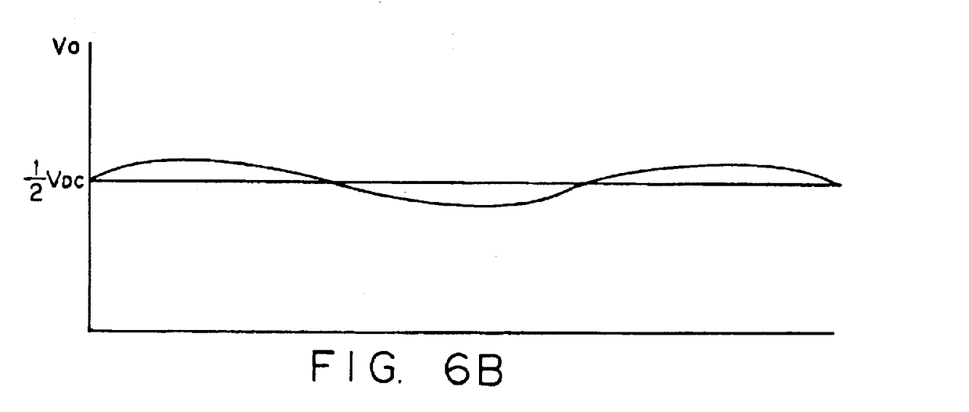
FIG. 6B shows the zero-phase voltage frequency when one terminal of the transformer is connected to the neutral point of the DC power source.

In FIG. 6A, the configuration of the DC power source 601, the main inverter 602, the main AC motor 603, the transformer 101, the rectifying circuit 102, and the auxiliary power source 103 is the same as the configuration of the multi-output power conversion circuit shown in 2A. The difference from the configuration shown in FIG. 2A is that one terminal of the transformer 101 is connected to the neutral point of the DC power source 601. Thus, when one terminal of the transformer 101 is connected to the point of half the potential difference, it is possible to apply only the AC component not containing the DC component directly to the primary side of the transformer 101. That is, as shown in FIG. 6B, the zero-phase potential at the neutral point of the main inverter 602 is ½ VDC above 0.

Figure 6C:
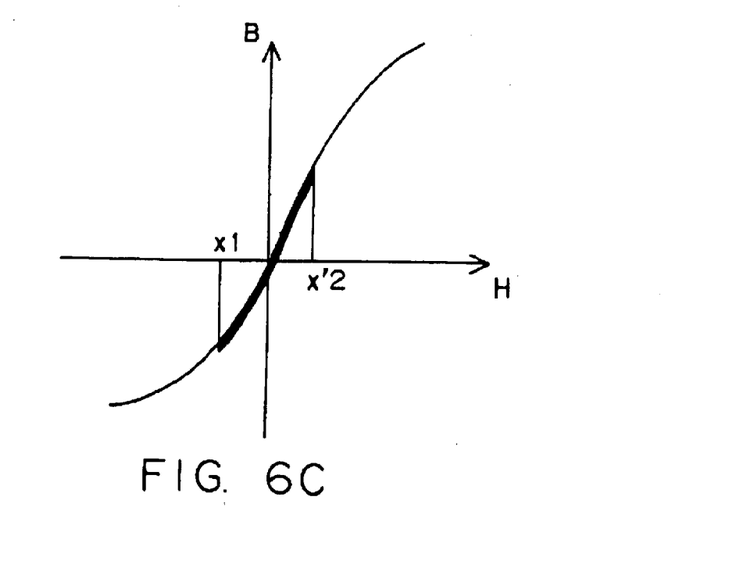
FIG. 6C shows the hysteresis curve of the transformer.

Since the transformer 101 can generate a constant current near the origin (with the largest tilt) as indicated by the hysteresis curve shown in FIG. 6C (the vertical axis$_0$ B indicates flux density, and the horizontal axis H indicates the magnetic field), the utilization of the transformer 101 is improved, thereby also improving the efficiency of the transformer 101.

In addition, the transformer 101 is connected to the capacitor in series in the multi-output power conversion circuit according to another aspect of the present invention.

Thus, by connecting one terminal of the transformer 101 to the neutral point of the main AC motor 603, and connecting a capacitor in series to the transformer 101, the DC component of the zero-phase current can be cut down. The other terminal of the capacitor can be either connected to the neutral point of the DC power source 601 or connected to the minus side (ground) of the DC power source of the circuit.

According to another embodiment of the multi-output power conversion circuit of the present invention, a capacitor instead of the transformer 101 can be connected to the neutral point of the main AC motor 603 to obtain an AC voltage by the zero-phase voltage frequency.

Thus, the AC voltage similar to that obtained by connecting the above mentioned transformer 101 can be obtained by connecting a capacitor to the neutral point of the main AC motor 603.

Furthermore, according to another embodiment of the multi-output power conversion circuit of the present invention, a capacitor is inserted between the phase (arm u, arm v, arm w) of the main AC motor 603 and the neutral of the main AC motor 603.

Figure 7:
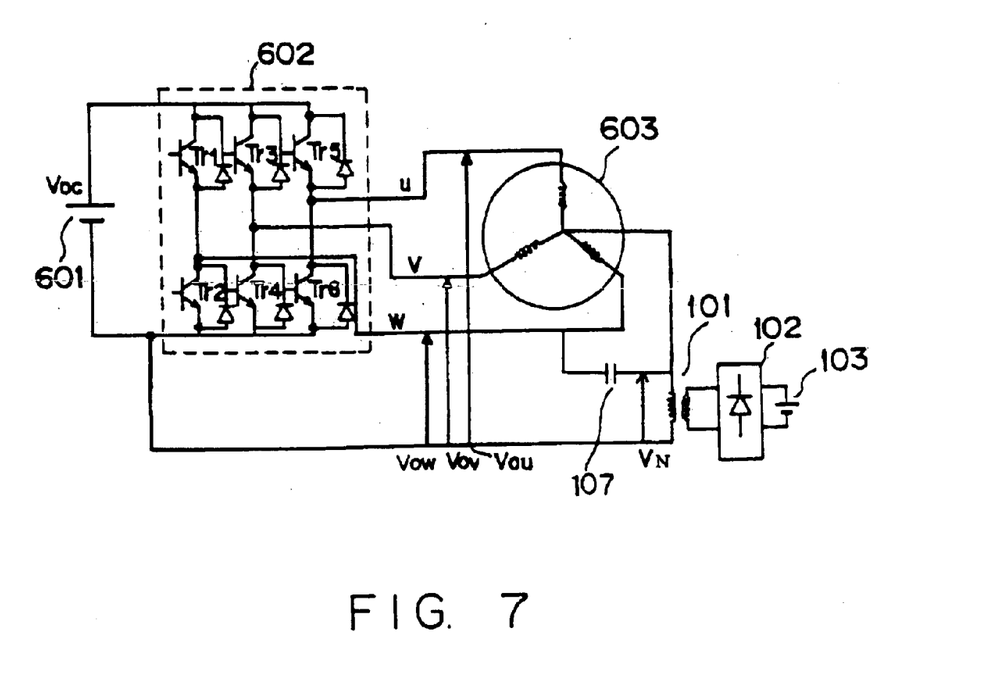
FIG. 7 shows the configuration of the multi-output power conversion circuit according to another embodiment of the present invention.

FIG. 7 shows the circuit obtained by inserting a capacitor between one of the output of the main inverter 602 and the neutral point of the main AC motor 603. The same configuration as in other embodiment is assigned the same reference numeral, and the detailed explanation is omitted here.

In FIG. 7, 107 denotes a bypass capacitor for bypassing the output current of the main inverter 602 and connecting it to the transformer 101. One terminal of the bypass capacitor 107 is connected to the arm w of the main AC motor 603, and the other terminal is connected to the transformer 101, thereby leading the carrier frequency component of the main AC motor 603 to the transformer 101.

Figure 8A:
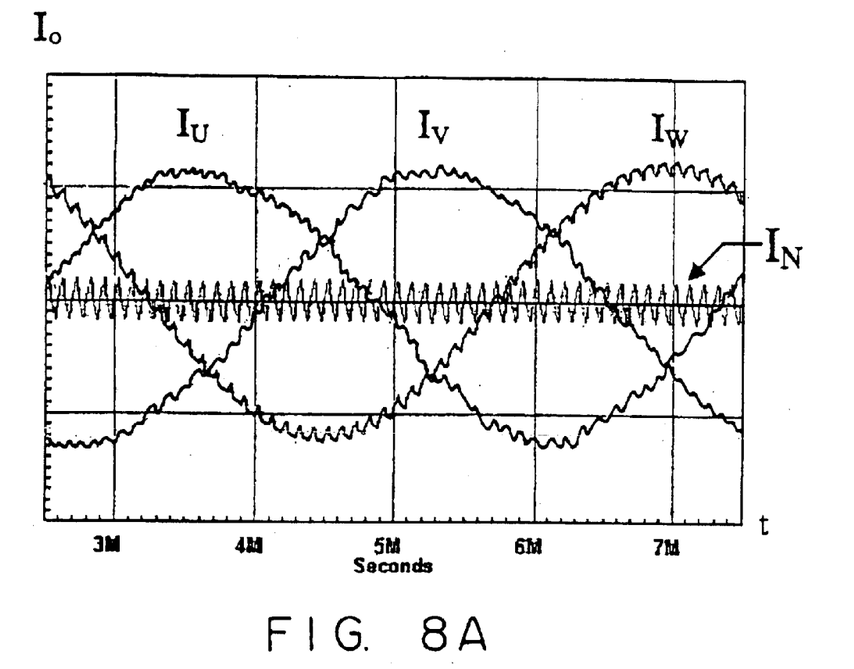
FIG. 8A shows the level of the current frequency at the neutral point when a bypass capacitor is not inserted.
Figure 8B:
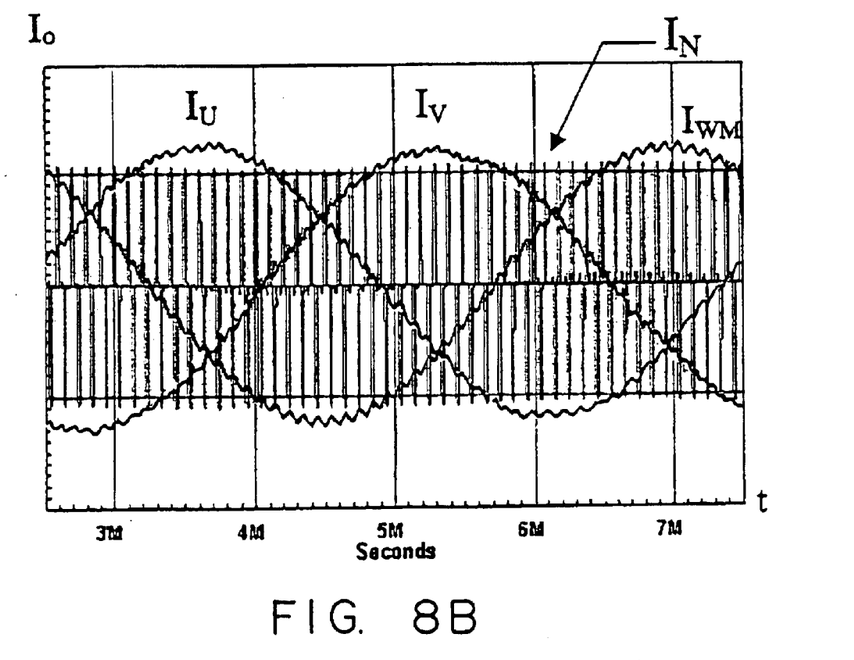
FIG. 8B shows the level of the current frequency at the neutral point when a bypass capacitor is inserted.

FIG. 8 shows the current waveform at the neutral point obtained when the bypass capacitor 107 is inserted between a phase of the main AC motor 603 and the main AC motor 603. FIG. 8A shows the current waveform at the neutral point obtained when no bypass capacitor 107 is inserted. FIG. 8B shows the current waveform at the neutral point obtained when the bypass capacitor 107 is inserted.

Iu, Iv, and Iw shown in FIG. 8 respectively indicate the output current of the three phases (arm u, arm v, arm w) of the main inverter 602, and In indicates the zero-phase current at the neutral point of the main AC motor 603.

The currents Iu, Iv, and Iw for driving the main AC motor 603 as shown in FIG. 8 are formed by the component proportional to the revolution of the main AC motor 603 and the carrier frequency component of the main inverter 602. Then, the carrier frequency component is obtained from the neutral point to the transformer 101.

At this carrier frequency, the current obtained from the neutral point of the main AC motor 603 is reduced due to the inductance of the main AC motor 603.

Therefore, the carrier frequency component of the main inverter 602 can be led to the transformer 101 without the inductor of the main AC motor 603 by connecting the bypass capacitor 107 between a phase of the main AC motor 603 and the transformer 101.

As a result, as shown in FIG. 8, the zero-phase current (FIG. 8B) at the neutral point obtained when the bypass capacitor 107 is inserted is larger than the zero-phase current (FIG. 8A) at the neutral point obtained when no bypass capacitor 107 is inserted.

In FIG. 7, the bypass capacitor 107 is inserted between the arm w in the arms (arm u, arm v, and arm w) of the main AC motor 603 and the neutral point of the motor, but the insertion position of the bypass capacitor 107 is not limited. The bypass capacitor 107 can also be inserted between a plurality of arms and the neutral point.

Thus, by inserting the bypass capacitor 107 between a phase of the main AC motor 603 and the neutral point of the main AC motor 603, the high frequency component, which is a carrier frequency, can bypass the coil (inductor) of the main AC motor 603, and can be led to the transformer 101. A large current can flow through the transformer 101 by setting the capacitance of the bypass capacitor 107 such that the impedance can be reduced at the carrier frequency of the main inverter 602. Thus, by passing the high frequency current, a smaller transformer 101 can be realized.

Since a high frequency component does not flow through the coil of the main AC motor 603, the core loss of the main AC motor 603 can be reduced.

The secondary power obtained by the transformer 101 of the multi-output power conversion circuit according to the present invention can also be used with a circuit other than the embodiments described above connected.

Furthermore, using the secondary power obtained by the transformer 101, an AC motor other than the main AC motor 603 can be driven, and a transformer is connected to the neutral point of the AC motor, thereby obtaining the third power. Thus, a plurality of AC motors can be serially connected using one output power source.

As described above, the secondary power obtained by a transformer is output to a circuit such as an auxiliary power source, an AC motor, etc. However, the secondary power can be output to any commonly known load device.

According to the multi-output power conversion circuit of the present invention, a transformer is connected to the neutral point of an AC motor, and the zero-phase AC generated at the neutral point of the AC motor can be obtained as the AC of the secondary output power source. Therefore, there is no need of an inverter required when other circuits such as an auxiliary power source, a motor, etc. are connected, thereby successfully realizing a smaller circuit.

Furthermore, by inserting a capacitor between the neutral point of an AC motor and a phase of the AC motor, a high frequency component can be passed to the transformer, thereby realizing a smaller transformer.

Additionally, since an AC of the secondary output power source is obtained by connecting a terminal of a transformer to the neutral point of an AC motor, a main inverter or a primary output power source is not affected by using the secondary output power source.

What is claimed is:

1. A multi-output power conversion circuit supplying electric power from one DC power source to a polyphase AC motor and another device with the polyphase AC motor, comprising:

a transformer of which the primary coil is connected to a neutral point of the polyphase AC motor and of which the secondary coil is connected to the other device.

2. The circuit according to claim 1, wherein said polyphase AC motor is a first three-phase AC motor; and said other device is any of an auxiliary power source, a DC motor, and a second three-phase AC motor.

3. The circuit according to claim 1, wherein an AC voltage from the transformer is controlled by changing a command value when the polyphase AC motor is drive-controlled.

4. A multi-output power conversion circuit supplying electric power from one DC power source to a polyphase AC motor and another device with the polyphase AC motor, comprising:

a transformer, one terminal of which primary coil is connected to a neutral point of the polyphase AC motor, another terminal of which the primary coil is connected to a portion of half potential of the DC power source, and which the secondary coil is connected to the other device.

5. The circuit according to claim 1, wherein a capacitor is connected in series to said transformer.

6. The circuit according to claim 4, wherein a capacitor is connected in series to said transformer.

7. A multi-output power conversion circuit supplying electric power from one DC power source to a polyphase AC motor and another device with the polyphase AC motor, comprising:

a transformer of which the primary coil is connected to a neutral point of the polyphase AC motor and of which the secondary coil is connected to the other device; and a capacitor, one of which terminals is connected to a neutral point of the polyphase AC motor, and another terminal of which is connected to a current phase driving the polyphase AC motor.

8. A power source which is connected to a DC power source and supplies a power source to a polyphase AC motor and another device, comprising;

a conversion circuit converting output of the DC power source into an AC to be provided for the polyphase AC motor;

a transformer connected to a neutral point of the polyphase AC motor; and a rectifying circuit rectifying output of the transformer and supplying the rectified output to the other device.

* * * * *

UNITED STATES PATENT AND TRADEMARK OFFICE
CERTIFICATE OF CORRECTION

PATENT NO. : 6,836,416 B2
DATED : December 28, 2004
INVENTOR(S) : Yoshiaki Ishihara et al.

It is certified that error appears in the above-identified patent and that said Letters Patent is hereby corrected as shown below:

Title page,
Item [75], Inventors, please delete "Koshiaki Ishihara" and insert therefore -- Yoshiaki Ishihara --

Column 6,
Line 28, please delete "$Vov=V\sin(\omega t-2/3)+V+V_1\sin\omega_1 t$" and insert therefore -- $Vov=V\sin(\omega t-2/3\pi)+V+V_1\sin\omega_1 t$ --

Column 7,
Line 9, please delete "$axis_0$" and insert therefore -- axis --

Signed and Sealed this

Twenty-ninth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,836,416 B2  
DATED : December 28, 2004  
INVENTOR(S) : Yoshiaki Ishihara et al.

It is certified that error appears in the above-identified patent and that said Letters Patent is hereby corrected as shown below:

Title page,
Item [73], Assignee, please delete "Kabushiki Kaishi Toyota Jidoshokki" and insert therefore -- Kabushiki Kaisha Toyota Jidoshokki --

Signed and Sealed this

Thirty-first Day of May, 2005

JON W. DUDAS  
*Director of the United States Patent and Trademark Office*